(12) United States Patent
Seo

(10) Patent No.: US 7,853,981 B2
(45) Date of Patent: Dec. 14, 2010

(54) MULTIMEDIA STREAMING SERVICE SYSTEM AND METHOD

(75) Inventor: Kwang Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1196 days.

(21) Appl. No.: 10/874,597

(22) Filed: Jun. 24, 2004

(65) Prior Publication Data
US 2005/0071491 A1 Mar. 31, 2005

(30) Foreign Application Priority Data
Sep. 27, 2003 (KR) ...................... 10-2003-0067181

(51) Int. Cl.
*H04N 7/173* (2006.01)
(52) U.S. Cl. .................... 725/100; 725/87; 725/139; 725/151; 709/231
(58) Field of Classification Search .................. 725/86, 725/87, 91, 101, 100; 709/231, 237
See application file for complete search history.

(56) References Cited

U.S. PATENT DOCUMENTS

| | | | |
|---|---|---|---|
| 6,292,834 B1 | 9/2001 | Ravi et al. | |
| 6,330,286 B1 * | 12/2001 | Lyons et al. | 375/240.28 |
| 6,700,893 B1 * | 3/2004 | Radha et al. | 370/412 |
| 6,882,637 B1 * | 4/2005 | Le et al. | 370/349 |
| 6,907,005 B1 * | 6/2005 | Dahlman et al. | 370/236 |
| 6,907,460 B2 * | 6/2005 | Loguinov et al. | 709/224 |
| 2002/0019984 A1 * | 2/2002 | Rakib | 725/111 |
| 2002/0064149 A1 | 5/2002 | Elliott et al. | 370/352 |
| 2003/0004992 A1 * | 1/2003 | Matsui et al. | 707/512 |
| 2003/0014705 A1 * | 1/2003 | Suzuki et al. | 714/748 |
| 2003/0061369 A1 | 3/2003 | Aksu et al. | |

(Continued)

FOREIGN PATENT DOCUMENTS

CN 1402492 3/2003

(Continued)

OTHER PUBLICATIONS

Subhabrata Sen et al.: "Proxy Prefix Catching for Multimedia Streams" INFCOM '99. Eighteenth Annual Joint Conference of the IEEE Computer and Communications Societies. Proceedings. IEEE New York, NY, USA, IEEE, USA Mar. 21-25, 1999, Piscataway, NJ, USA, IEEE, US, Mar. 21, 1999, pp. 1310-1319, XP010323883.

(Continued)

*Primary Examiner*—Andrew Y Koenig
*Assistant Examiner*—Junior O Mendoza
(74) *Attorney, Agent, or Firm*—KED & Associates, LLP

(57) ABSTRACT

A multimedia streaming service system is provided that includes a VOD server to sequentially transmit a header (moov) and media data (mdat) of MP4 contents in a TCP packet and a client to transmit a streaming service request signal in HTTP to the VOD server. The client may accumulate the media data (mdat) received from the VOD server in a decoder buffer for a predetermined time, and reproduce the data on a real time basis. A guaranteed rate of QoS may be enhanced as compared to an RTP/UDP-based streaming method. A service delay time may be reduced as compared with a TCP-based downloading method, thereby implementing contents on a real time basis.

26 Claims, 4 Drawing Sheets

U.S. PATENT DOCUMENTS

| | | | |
|---|---|---|---|
| 2003/0112824 A1* | 6/2003 | Acosta ........................ | 370/474 |
| 2003/0131300 A1* | 7/2003 | Park et al. ................... | 714/748 |
| 2004/0083301 A1* | 4/2004 | Murase et al. .............. | 709/231 |
| 2004/0215804 A1* | 10/2004 | Tan ............................. | 709/231 |
| 2005/0237434 A1* | 10/2005 | Takatori et al. ............. | 348/725 |
| 2006/0112168 A1* | 5/2006 | Albers et al. ................ | 709/213 |
| 2006/0168262 A1* | 7/2006 | Frazer ........................ | 709/230 |

FOREIGN PATENT DOCUMENTS

| | | |
|---|---|---|
| EP | 1051008 | 11/2000 |
| JP | 2002-152274 | 5/2002 |
| JP | 2003-087786 | 3/2003 |
| KR | 1002618130000 | 4/2000 |
| KR | 2000-0041813 | 7/2000 |
| KR | 2002-0057837 | 7/2002 |
| WO | WO03028293 | 4/2003 |

OTHER PUBLICATIONS

Ana Pajares et al.: "JMFMoD: A New System for Media on Demand Presentations" Proceedings of the 28$^{th}$ Euromicro Conference, Euromicro 2002, Sep. 4, 2002, pp. 160-167, XP010612142.

Robert R. Chodorek: "Some Aspects of RTP-TCP Coexistence in Universal Multiservice Networks" Universal Multiservice Networks, 2000, ECUMN 2000. 1$^{st}$ European Conference on, Oct. 2, 2000, pp. 179-184, XP010520268.

M. Mathis et al. RFC 2018 "TCP Selective Acknowledgment Options," IETF Networking Group, Oct. 1996, URL, http://www.ietf.org/rfc/rfc2018.txt.

"Proxy Prefix Caching for Multimedia Streams"; Towsley, D. et al.; Dept. of Computer Science, University of Massachusetts, Amherst MA 01003; Mar. 25, 1999.

European Office Action dated Oct. 1, 2008.

* cited by examiner

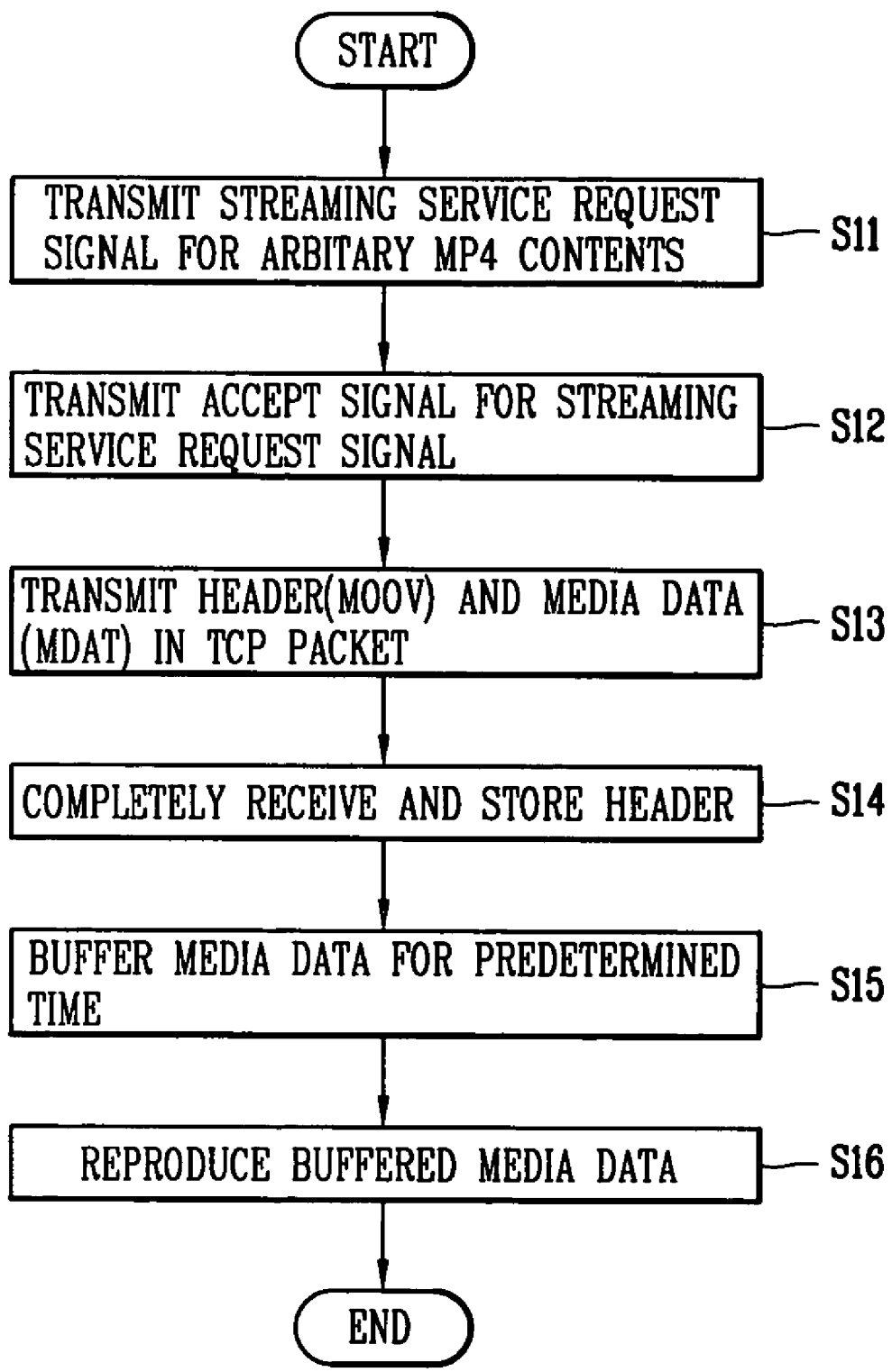

MULTIMEDIA STREAMING SERVICE SYSTEM AND METHOD

The present disclosure claims priority from Korean Patent Application No. 2003-0067181, filed Sep. 27, 2003, the subject matter of which is incorporated herein by reference.

BACKGROUND OF THE INVENTION

1. Field of the Invention

Embodiments of the present invention may relate to a multimedia streaming service. More particularly, embodiments of the present invention may relate to a multimedia streaming service system and method using Transmission Control Protocol (TCP).

2. Background of Related Art

Video on Demand (VOD) is a service in which a multimedia contents file is selectively received from a server according to a user's request and reproduced in a terminal. This may be implemented using a streaming method and a downloading method, for example.

FIG. 1 is a block diagram of a VOD service system according to an example arrangement. Other arrangements are also possible. As shown, the VOD service system includes a VOD server 10, a client 20 and a network 30. The client 20 requests, receives and executes a VOD service. The network 30 connects the VOD server 10 and the client 20 and transmits data and commands between the two entities.

The VOD server 10 may convert a large quantity of multimedia contents file into a digital compression image signal (or file) and store the data in a database 11. The VOD server 10 may provide the multimedia contents file to the client 20 upon request. The VOD server 10 may also perform service operation and management such as billing and monitoring generated as the multimedia contents file is provided.

The client 20 may be a terminal that includes an input unit and a display unit. The client 20 may transmit a request or a command of a user to the VOD server 10. The client 20 may decode and display the multimedia contents file received from the VOD server 10.

The network 30 may support high speed transmission in order to transmit a large quantity of continuous multimedia data between the VOD server 10 and the client 20.

The multimedia contents file may be in MP4 file format, for example, and may be stored in the database 11 of the VOD server 10. FIG. 2 illustrates a format of a MP4 file according to an example arrangement. Other arrangements and formats are also possible. More specifically, FIG. 2 shows the MP4 file divided into a header (moov) and media data (mdat) including audio and video data.

The header (moov) may include information about an audio region and a video region, and meta information for accessing and reproducing the media data (mdat).

Such a VOD service system as described above may provide a service of a streaming method and/or downloading method.

In a streaming method, received multimedia information may be buffered for only a short delay time and then reproduced. In order to guarantee a real time transmission of the multimedia contents, Real-time Transport Protocol (RTP) and User Datagram Protocol (UDP), which is a connectionless protocol, may be used for the transmission.

FIG. 3 illustrates a RTP/UDP stack and an RTP packet according to an example arrangement. Other arrangements are also possible. As shown in FIG. 3, in the streaming method, substantial multimedia data may be RTP-packetized and capsularized to a UDP header and an IP header so as to be transmitted. The RTP packet may be a payload of a UDP, including an RTP header and an RTP payload storing the multimedia data.

The RTP header may include a version (V) of the RTP, an extension (X), a padding (P), a CSRC count (CC), a marker (M) defining a profile, a payload type (PT) defining a type and characteristic of the multimedia data stored in the RTP payload, a sequence number, a time stamp indicating a transmission point, a Synchronization number (SSRC), and a Contribution Source (CSRC). The extension (X) may be used to extend the RTP header information. For example, when the extension (X) is set to "1", there may be a header extension.

In the streaming method, when the client 20 transmits a request for specific multimedia contents to the VOD server 10, the VOD server 10 may transmit the multimedia contents stored as an MP4 file in the database 11 to the client 20 using RTP/UDP. The multimedia payload expressed as the media data part (mdat) may be RTP-packetized with each media synchronized through a time stamp field, and then transmitted in UDP.

UDP is a protocol commonly used to support multicasting that requires high speed transmission rather than reliability of transmission data. Thus, it may be suitable for transmission of real time multimedia contents. However, since UDP does not have a function for error-correction of transmission data or re-transmission of a packet discarded during transmission, UDP does not generally improve Quality of Service (QoS).

Thus, with the RTP/UDP-based streaming method, the user may receive and check the multimedia contents on a real time basis. However, due to limitations in transmission bandwidths, quality of the multimedia contents transmittable to a receiving party may be limited. Some data may even be lost based on the transmission environment.

In a downloading method, the client 20 may completely download a multimedia contents file from the VOD server 10 and then reproduce the data. Thus, the multimedia contents identical to an original version stored in the VOD server 10 can be reproduced with high picture quality. More specifically, when the client 20 transmits a request for specific multimedia contents to the VOD server 10, the VOD server 10 transmits the corresponding multimedia contents file in a TCP packet(s) to the client 20. The client 20 may receive the TCP packet(s) and store the packet(s) in a storage disk (not shown). After the entire multimedia contents file is downloaded, the client 20 decodes and reproduces the received multimedia contents file.

However, in spite of such advantages that multimedia contents substantially identical to the original version stored in the VOD server is provided with a high picture quality, the downloading method has disadvantages in that the user may wait for a long time to check the contents. Additionally, a large storage space may be required on the client side.

The RTP/UDP-based streaming method may be suitable for real-time service requiring a low delay; however, the QoS is not desirably guaranteed. Meanwhile, the TCP-based downloading methods may guarantee the QoS; however, a long time may be taken in a standby state for reproducing the multimedia contents file, thereby failing to provide real time service.

SUMMARY OF THE INVENTION

An object of the invention may be to solve at least the above problems and/or disadvantages and to provide at least the advantages described hereinafter.

Embodiments of the present invention may provide a multimedia streaming service system and method that guarantees a QoS by implementing a streaming service using TCP.

Embodiments of the present invention may provide a multimedia streaming service system that includes a VOD server and a client. The VOD server may sequentially transmit a header (moov) and media data (mdat) of MP4 contents in a TCP packet. The client may transmit a streaming service request signal in HTTP to the VOD server. The client may accumulate the media data (mdat) received from the VOD server in a decoder buffer for a predetermined time, and reproduce the data on a real time basis.

Embodiments of the present invention may provide a multimedia streaming service method that includes transmitting multimedia contents as requested from a receiving party in at least one TCP packet, buffering the at least one TCP packet received from a transmitting party for a predetermined time, and reproducing the at least one TCP packet on a real time basis.

Embodiments of the present invention may provide a multimedia streaming service method that includes a client transmitting a streaming service request signal for MP4 contents, for example, to a VOD server. The method may also include the VOD server transmitting an accept signal for the streaming service request signal. The VOD server may sequentially transmit header (moov) and media data (mdat) information of the corresponding MP4 contents to the client using a TCP packet. The client may receive the header (moov) and buffer the media data (mdat) for a predetermined time. The media data (mdat) may then be reproduced.

Embodiments of the present invention may provide a multimedia streaming service method that includes a client transmitting a streaming service request signal in HTTP to a VOD server. An accept signal for the streaming service request signal may be transmitted. The VOD server may transmit a header (moov) and media data (mdat) of an MP4 contents to the client through a TCP packet. The header (moov) may be stored in a memory. The media data may be buffered in a decoder buffer for a decoder operation standby time and a re-transmission service standby time. The buffered media data (mdat) may then be reproduced.

Additional advantages, objects, features and embodiments of the present invention may be set forth in part in the description that follows and in part may become apparent to those having ordinary skill in the art upon examination of the following or may be learned from practice of the invention.

BRIEF DESCRIPTION OF THE DRAWINGS

The following represents brief descriptions of the drawings in which like reference numerals refer to like elements and wherein:

FIG. 5 is a flow chart of a multimedia streaming service method in accordance with an example embodiment of the present invention.

DETAILED DESCRIPTION OF PREFERRED EMBODIMENTS

Figure 1:
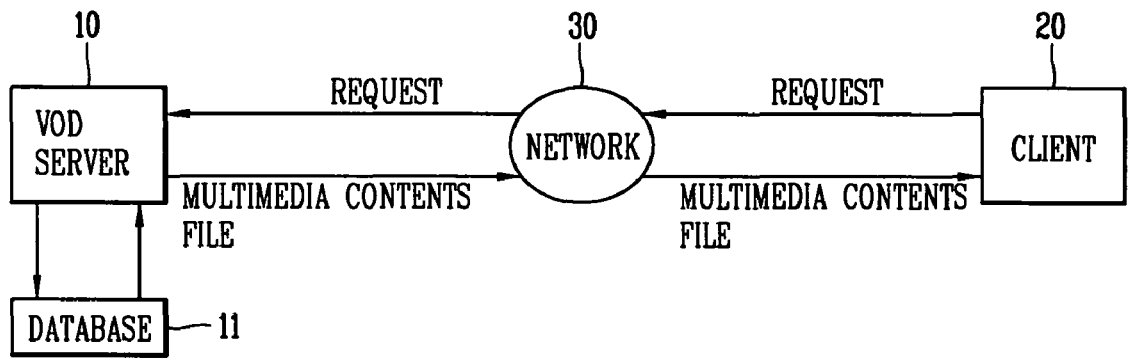
FIG. 1 is a block diagram showing a VOD service system according to an example arrangement.
Figure 2:
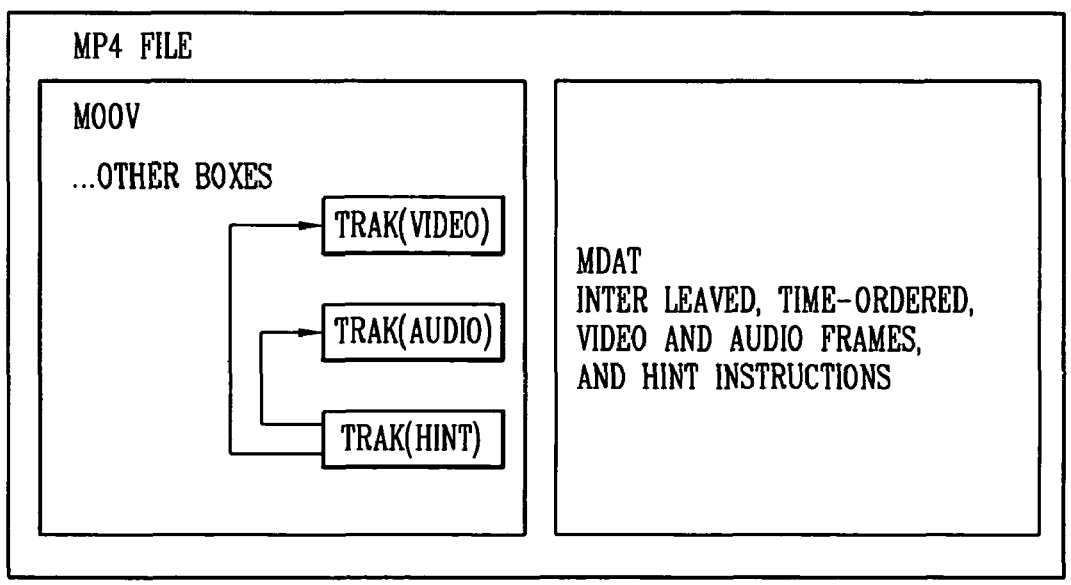
FIG. 2 illustrates a format of an MP4 file according to an example arrangement.
Figure 3:
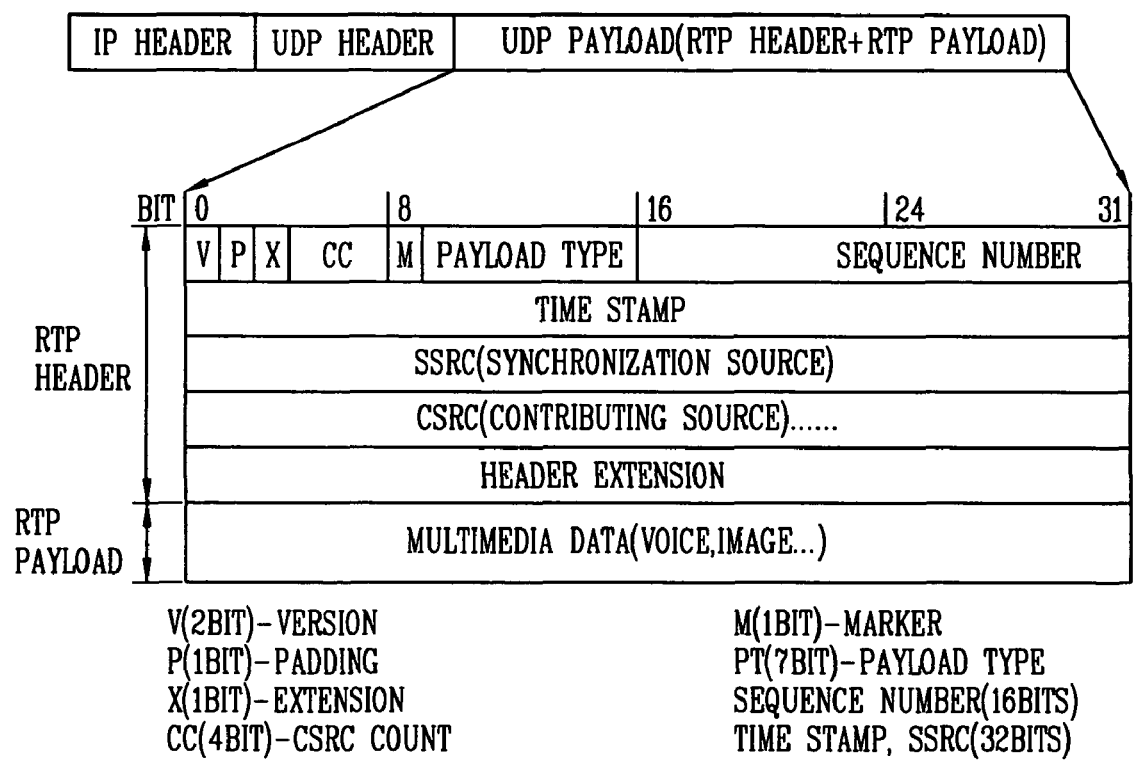
FIG. 3 illustrates a Real-time Transport Protocol (RTP)/User Datagram Protocol (UDP) stack and an RTP packet according to an example arrangement.
Figure 4:
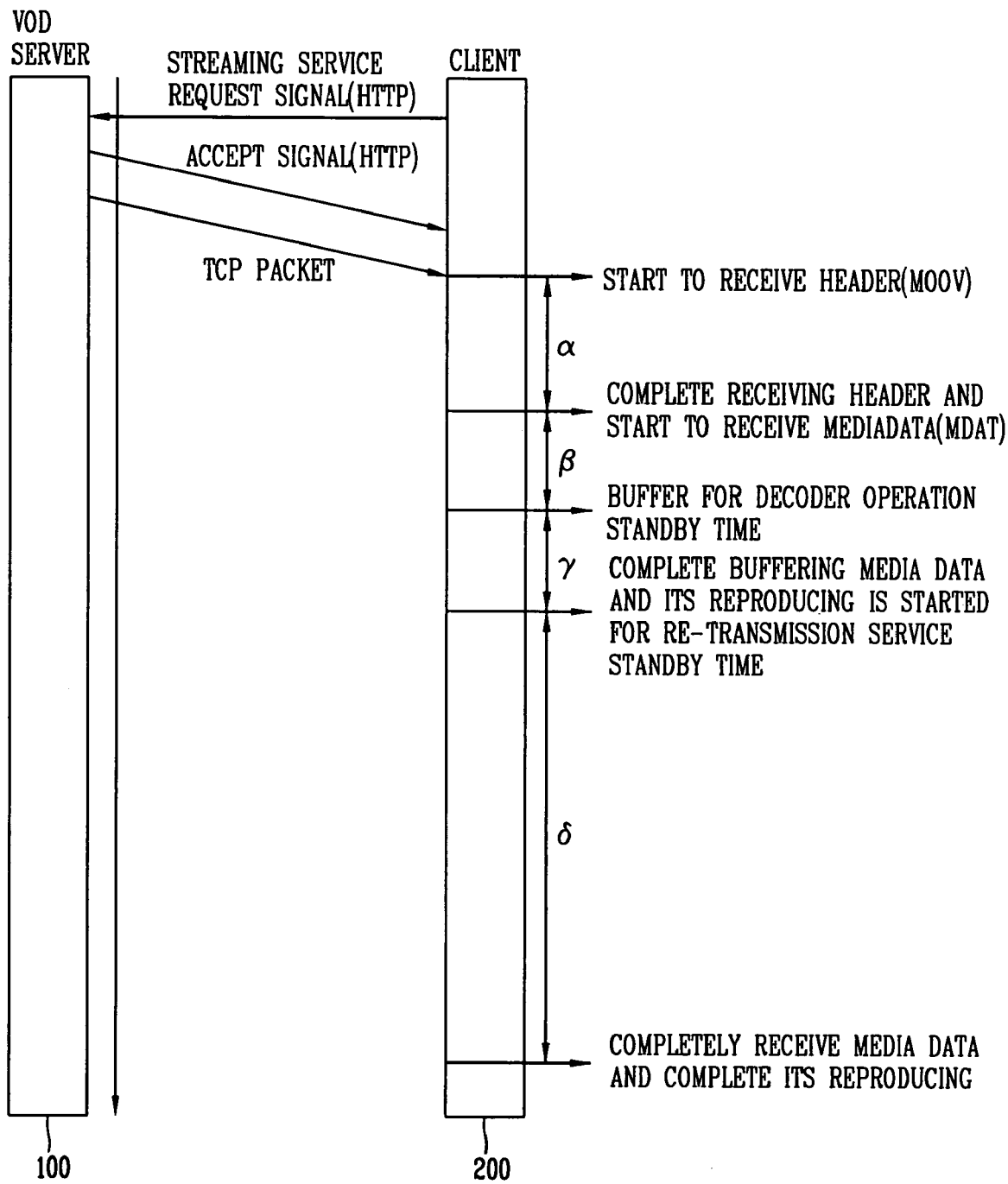
FIG. 4 illustrates a multimedia streaming service system in accordance with an example embodiment of the present invention.

FIG. 4 illustrates a multimedia streaming service system in accordance with an example embodiment of the present invention. Other embodiments and configurations are also within the scope of the present invention. As shown, the multimedia streaming service system may include a VOD server 100 and a client 200. The VOD server 100 may transmit a multimedia contents file using TCP in response to a streaming service request signal. The client 200 may store the multimedia contents file received from the VOD server 100 for a predetermined time, and decode and display the file for user recognition.

The VOD server 100 may include a database (not shown in FIG. 4) to store the multimedia contents file in an MP4 format so that when a streaming service request signal is received from the client 200, the VOD server 100 may sequentially transmit the header (moov) and the media data (mdat) of the corresponding contents file using a TCP packet (or TCP packets).

After completely receiving the TCP packet including the header (moov) of the multimedia contents from the VOD server 100, the client 200 may buffer the media data (mdat) for a disk operation standby time ($\beta$) and a retransmission service standby time ($\gamma$). The client 200 may then decode and reproduce the received multimedia contents file. While the multimedia contents file is being reproduced, the client 200 may keep receiving TCP packet (or TCP packets) from the VOD server 100.

Since the header (moov) of the multimedia contents includes meta information required for reproducing the media data (mdat), the header should be stored in a memory (not shown in FIG. 4) of the client 200 until the multimedia streaming service is terminated.

That is, the client 200 may include memory (not shown in FIG. 4) for storing the header (moov) of the multimedia contents received from the VOD server 100, a decoder (not shown in FIG. 4) for decoding the media data (mdat), and a decoder buffer (not shown in FIG. 4) for buffering a predetermined amount of media data (mdat) to be decoded.

Operation of the multimedia streaming service system in accordance with an example embodiment of the present invention will now be described with reference to FIG. 4.

The client 200 may transmit a streaming service request signal for specific multimedia contents to the VOD server 100 using Hypertext Transfer Protocol (HTTP). The VOD server 100 may transmit a response signal to the streaming service request signal to the client 200 using HTTP. The VOD server 100 may sequentially transmit the header (moov) and the media data (mdat) of the corresponding multimedia contents in a TCP packet to the client 200. In this example, the multimedia contents is the MP4 file format, although other formats are also possible.

The client 200 receives the TCP packet including the header (moov) from the VOD server 100 for a predetermined time ($\alpha$), and then receives a portion of the media data (mdat) by the decoder buffer (not shown in FIG. 4) for the decoder operation standby time ($\beta$).

The decoder operation standby time ($\beta$) may be from a time point when the media data reaches the decoder buffer to a time point when the decoder starts its operation. By starting decoding after the decoder operation standby time ($\beta$) during which the media data (mdat) is sufficiently accumulated in the decoder buffer, overflow and/or underflow of the decoder buffer may be prevented. The multimedia contents may be transmitted in the TCP packet in order to guarantee QoS from a packet loss possibly generated due to a communication channel error. As such, there may be a delay time based on TCP retransmission, if retransmission is performed.

Thus, in order to maintain the reproducing service even for the time taken for retransmission of the TCP packet, the media data (mdat) may be accumulated in the decoder buffer. Thus, the client 200 performs an additional buffering for the retransmission service standby time.

The decoder operation standby time ($\beta$) and the retransmission service standby time ($\gamma$) may be recorded (or provided) in the header. During the decoder operation standby time ($\beta$) and the retransmission service standby time ($\gamma$), the media data (moov) accumulated in the decoder buffer may be decoded to be reproduced based on the meta information included in the header (moov).

FIG. 5 is a flow chart of a multimedia streaming service method in accordance with an example embodiment of the present invention. Other operations, orders of operations and embodiments are also within the scope of the present invention.

As shown in FIG. 5, the client 200 may transmit a streaming service request signal for arbitrary multimedia contents by HTTP to the VOD server 100 (step S11). The VOD server 100 may transmit an accept signal for the streaming service request signal (step S12), and sequentially transmit the header (moov) and the media data (mdat) of the contents of the corresponding MP4 format through the TCP packet to the client 200 (step S13).

The client may completely receive the header (moov) during a predetermined time ($\alpha$) and store the data in the memory of the client 200 (step S14). Since the header (moov) includes meta information for reproducing the media data (mdat), the data may be stored in the memory, rather than in the decoder buffer, until the stream service is terminated.

The client 200 may buffer the media data (mdat) sequentially received following the header (moov) in the decoder buffer for the decoder operation standby time ($\beta$), and then again buffer for the retransmission service standby time ($\gamma$) (step S15). The decoder operation standby time ($\beta$) and the retransmission service standby time ($\gamma$) may be provided within the header (moov) of the TCP packet.

The retransmission service standby time ($\gamma$) may be a time taken for retransmitting data of the TCP packet or a time taken for accumulating an extra TCP packet in the decoder buffer in order to maintain reproducing of the media data (mdat) of the contents even while a transmission delay takes place based on the communication environment. The longer the retransmission server standby time ($\gamma$) is extended, the more the guaranteed rate of the QoS can be increased. However, a streaming service delay may also be increased. Thus, a suitable value may be set by experimentation or other methodology.

That is, while the media data (mdat) of the contents is being reproduced, if an error is detected from the TCP packet transmitted from the VOD server 100, the client 200 may request retransmission of the corresponding TCP packet. Even while the corresponding TCP packet is rereceived from the VOD server 100, the reproducing operation of the media data may be continuously maintained.

During the decoder operation standby time ($\beta$) and the retransmission service standby time ($\gamma$), the media data accumulated in the decoder buffer may be decoded and displayed through the terminal for a preset (or predetermined) reproduction time. While the media data is being reproduced, the TCP packet may be completely received (step S16).

The multimedia streaming apparatus and method according to embodiments of the present invention may include a TCP-based streaming method that supplements disadvantages of the RTP/UDP-based streaming method and the TCP-based downloading method so that a service delay time is longer than the RTP/UDP-based streaming method but shorter than the TCP-based downloading method.

The service delay time will now be comparatively described with reference to FIG. 4. As shown in FIG. 4, time parameters used for the operational process of embodiments of the present invention may include a time ($\alpha$) taken for completely receiving the header (moov) of the MP4 contents, a decoder operation standby time ($\beta$), a retransmission service standby time ($\gamma$) and a time ($\delta$) taken for completely receiving the media data (mdat) of the MP4 contents.

The service delay time generated in the RTP-based streaming method may be $\beta$ with a situation of the transmission communication network and a minor influence generated due to a size of a header of a packet or the like, a service delay time generated from the TCP-based downloading method may be $\alpha+\beta+\gamma+\delta$, and a service delay time of the TCP-based streaming method may be $\alpha+\beta+\gamma$.

The receiving completion time ($\delta$) of the media data may have the greatest value so that in spite of a bit of service delay time, the TCP-based streaming method may implement the QoS-guaranteed streaming method.

Accordingly, after the client accumulates a contents file transmitted through the TCP from the VOD server into the decoder buffer as much as a time reflecting the situation of the transmission communication network and the delay according to the retransmission function of the TCP packet, the contents file may be reproduced on a real time basis. Therefore, the service delay time can be reduced and the guaranteed rate of QoS may be increased.

The foregoing embodiments and advantages are merely exemplary and are not to be construed as limiting the scope of the present invention. The present teaching can be readily applied to other types of apparatuses and methodologies. The description of the present invention is intended to be illustrative, and not to limit the scope of the claims. Many alternatives, modifications, and variations will be apparent to those skilled in the art.

What is claimed is:

1. A multimedia streaming service system comprising:
a video on demand (VOD) server to transmit a header and media data in at least one transmission control protocol (TCP) packet; and
a client that includes a memory, a decoder and a decoder buffer, the client to transmit a streaming service request signal in Hypertext Transfer Protocol (HTTP) to the VOD server, the client to receive the header and store information from the header in the memory for a first predetermined time, the header including information of a decoder operation standby time and information of a retransmission service standby time,
wherein after completely receiving the header in the memory, the client to accumulate the media data received from the VOD server in the decoder buffer for a second predetermined time that begins at an end of the first predetermined time,
wherein the client to provide the media data accumulated in the decoder buffer to the decoder after the decoder operation standby time from the end of the first predetermined time for reproduction of the data on a real time basis, and the client at a same time to accumulate the media data transmitted in the at least one TCP packet from the VOD server into the decoder buffer,
wherein the second predetermined time is based on an addition of the decoder operation standby time that is received by the client within the header and the retransmission service standby time that is received by the client within the header, wherein the decoder operation standby time corresponds to an amount of time from when the media data reaches the decoder buffer to a time point when the decoder starts decoding, and the retransmission service standby time corresponds to extra time for retransmitting a lost TCP packet, and the decoder buffer accumulates the media data for the second predetermined time that includes the added total of the decoder operation standby time and the retransmission service standby time after the end of the first predetermined time.

2. The system of claim 1, wherein the memory to store the header until reproducing of the media data is terminated.

3. The system of claim 1, wherein the client detects a lost packet based on the header of the at least one TCP packet, and the client transmits a packet retransmission request signal to the VOD server based on the detected lost packet.

4. The system of claim 1, wherein the header and the media data relate to MP4 contents.

5. The system of claim 1, wherein each of the memory, the decoder and the decoder buffer are separate elements of the client.

6. A multimedia streaming service method comprising:
transmitting multimedia contents in a transmission control protocol (TCP) packet, the TCP packet including a header and media data, the header including information of a decoder operation standby time and information of a retransmission service standby time;
storing the information of the header in a memory for a first predetermined time;
buffering, in a buffer, the TCP packet received from a transmitting party for a second predetermined time that begins at an end of the first predetermined time, wherein the second predetermined time is determined based on an addition of the decoder operation standby time and the retransmission service standby time that are both received within the header of the TCP packet, the decoder operation standby time being a time for media data within the TCP packet to wait for after the first predetermined time and until a decoder starts decoding the media data stored in the buffer, and the retransmission service standby time corresponding to extra time for retransmitting a lost TCP packet; and
providing the media data from the buffer to the decoder and reproducing the buffered TCP packet on a real time basis and at a same time accumulating media data transmitted in the TCP packet into the buffer.

7. The method of claim 6, wherein the multimedia contents comprise an MP4 file format and include the header and the media data.

8. The method of claim 6, wherein transmitting the multimedia contents comprises:
transmitting a streaming service request signal from a receiving party to the transmitting party;
transmitting an accept signal for the streaming service request signal; and
transmitting corresponding multimedia contents information in the TCP packet to the receiving party.

9. The method of claim 8, wherein the streaming service request signal and the accept signal are transmitted using Hypertext Transfer Protocol (HTTP).

10. The method of claim 6, wherein reproducing the buffered TCP packet comprises:
continuously receiving the TCP packet from the transmitting party even while the received multimedia contents are being reproduced.

11. The method of claim 6, wherein reproducing the buffered TCP packet comprises:
buffering the TCP packet received from the transmitting party for the second predetermined time that includes the decoder operation standby time;
reproducing the received TCP packet; and
rereceiving an error-generated TCP packet.

12. The method of claim 6, wherein the information received within the header to determine the second predetermined time includes:
a time to completely receive a header of the multimedia contents; and
a time to receive a portion of media data of the multimedia contents.

13. A multimedia streaming service method comprising:
transmitting a streaming service request signal to a video on demand (VOD) server;
transmitting header and media data information using a transmission control protocol (TCP) packet, the TCP packet including the header and the media data information, the header including information of a decoder operation standby time and information of a retransmission service standby time;
receiving the header for a first predetermined time and storing the header in a memory;
buffering data in a buffer for a second predetermined time that begins at an end of the predetermined time based on information received within the header, wherein the information received within the header includes the decoder operation standby time that corresponds to a time from when the media data reaches the buffer to a time when a decoder starts decoding and the retransmission service standby time for re-transmission of a lost TCP packet;
decoding the media data from the buffer by using the decoder; and
reproducing the decoder media data from the decoder and at a same time accumulating media data transmitted in the TCP packet into the buffer.

14. The method of claim 13, further comprising transmitting an accept signal for the streaming service request signal.

15. The method of claim 13, wherein the streaming service request signal and the accept signal are transmitted using Hypertext Transfer Protocol (HTTP).

16. The method of claim 13, wherein receiving the header and buffering the data in the buffer comprises:
receiving the header for a first predetermined time; and
buffering the media data in the buffer for the decoder operation standby time and the retransmission service standby time after an end of the first predetermined time.

17. The method of claim 13, wherein the reproducing comprises:
detecting an error of the received TCP packet using the header;
requesting retransmission of an error-generated TCP packet; and
receiving a retransmitted TCP packet.

18. The method of claim 13, wherein the header is stored in the memory until reproducing of the media data is terminated.

19. The method of claim 13, wherein the header and the media data relate to MP4 contents.

20. A multimedia streaming service method comprising:
transmitting a header and media data to a client using a transmission control protocol (TCP) packet, the TCP packet including a header and media data, the header including information of a decoder operation standby time and information of a retransmission service standby time;

storing the header in a memory of the client for a first amount of time;

buffering the media data in a decoder buffer of the client for at least a total time that begins after the first amount of time, the total time based on an addition of a decoder operation standby time and a retransmission service standby time that are both provided within the transmitted header, wherein the decoder operation standby time corresponds to a time from when the media data reaches the decoder buffer to a time when a decoder starts decoding of the media data from the decoder buffer;

decoding the media data from the decoder buffer after the first amount of time and by using the decoder; and reproducing the media data from the decoder buffer and the client at a same time accumulating media data transmitted in the TCP packet into the decoder buffer.

21. The method of claim 20, further comprising:
transmitting a streaming service request signal in Hypertext Transfer Protocol (HTTP) to a video on demand (VOD) server; and
transmitting an accept signal for the streaming service request signal.

22. The method of claim 20, wherein the reproducing comprises:
detecting an error of the received TCP packet using the header; and
requesting retransmission of the TCP packet server when a packet error is detected.

23. The method of claim 20, wherein the header and the media data relate to MP4 contents.

24. A multimedia streaming service system comprising:
a video on demand (VOD) server to transmit header and media data in a transfer control protocol (TCP) packet, the header including both decoder operation standby time information and retransmission service standby time information; and
a client including a memory, a decoder and a buffer, the client to receive the TCP packet for a first predetermined time and to store the media data in the buffer for a second predetermined time that begins at an end of the first predetermined time based on an addition of the decoder operation standby time information and the retransmission service standby time information that are received at the client in the header of the TCP packet, wherein the header is stored in the memory,
wherein the decoder operation standby time information corresponding to a decoder operation standby time from a time point when the media data reaches the buffer to a time point when the decoder starts decoding of the media data from the buffer, and the retransmission service standby time information corresponding to a retransmission service standby time for accumulating an extra time required for retransmitting a lost TCP packet,
the client to provide the media data in the buffer to the decoder for decoding and then reproducing the media data, and the client at a same time to accumulate the media data received in the TCP packet from the VOD server into the buffer.

25. The system of claim 24, wherein the client to reproduce the data on a real time basis.

26. The system of claim 24, wherein the client includes a memory to store the header until reproducing of the media data is terminated.

* * * * *